United States Patent [19]

Manschitz

[11] Patent Number: 4,775,159
[45] Date of Patent: Oct. 4, 1988

[54] CHUCK FOR A DRILLING TOOL

[75] Inventor: Erwin Manschitz, Germering, Fed. Rep. of Germany

[73] Assignee: Hilti Aktiengesellschaft

[21] Appl. No.: 64,206

[22] Filed: Jun. 18, 1987

[30] Foreign Application Priority Data

Jul. 18, 1986 [DE] Fed. Rep. of Germany ....... 3624232

[51] Int. Cl.⁴ ...................... B23B 31/04; B25D 17/08
[52] U.S. Cl. ..................................... 279/19.3; 173/48; 279/19; 279/19.5; 279/62
[58] Field of Search ...................... 173/47, 48; 279/19, 279/19.3, 19.4, 19.5, 60–65

[56] References Cited

U.S. PATENT DOCUMENTS 4,585,077 4/1986 Bergler .................................. 173/48

FOREIGN PATENT DOCUMENTS 3409494 9/1985 Fed. Rep. of Germany ........ 279/19

Primary Examiner—Gil Weidenfeld
Assistant Examiner—Steven C. Bishop
Attorney, Agent, or Firm—Toren, McGeady & Associates

[57] ABSTRACT

A chuck for receiving and holding the shank of a drilling tool includes a chuck member with a central bore. An anvil for transmitting axially directed percussive force extends into a rear end of the central bore. Clamping jaws are movable in guide channels formed in the chuck member extending into the central bore ahead of the anvil for frictionally locking the shank. In the region of the chuck member into which the anvil is located, there is a radially extending passageway through the chuck member extending between the central bore and a guide channel. A retaining member is radially displaceable through the passageway and has a dimension so that it can project outwardly or inwardly from the passageway. When the remaining member extends radially inwardly from the passageway, it can seat within an annular groove in the anvil and hold the anvil in a position so that it does not transmit percussive force. If the retaining member extends radially outwardly from the passageway, it can seat within a groove in a clamping jaw and secure the clamping jaw out of frictional contact with the shank.

9 Claims, 1 Drawing Sheet

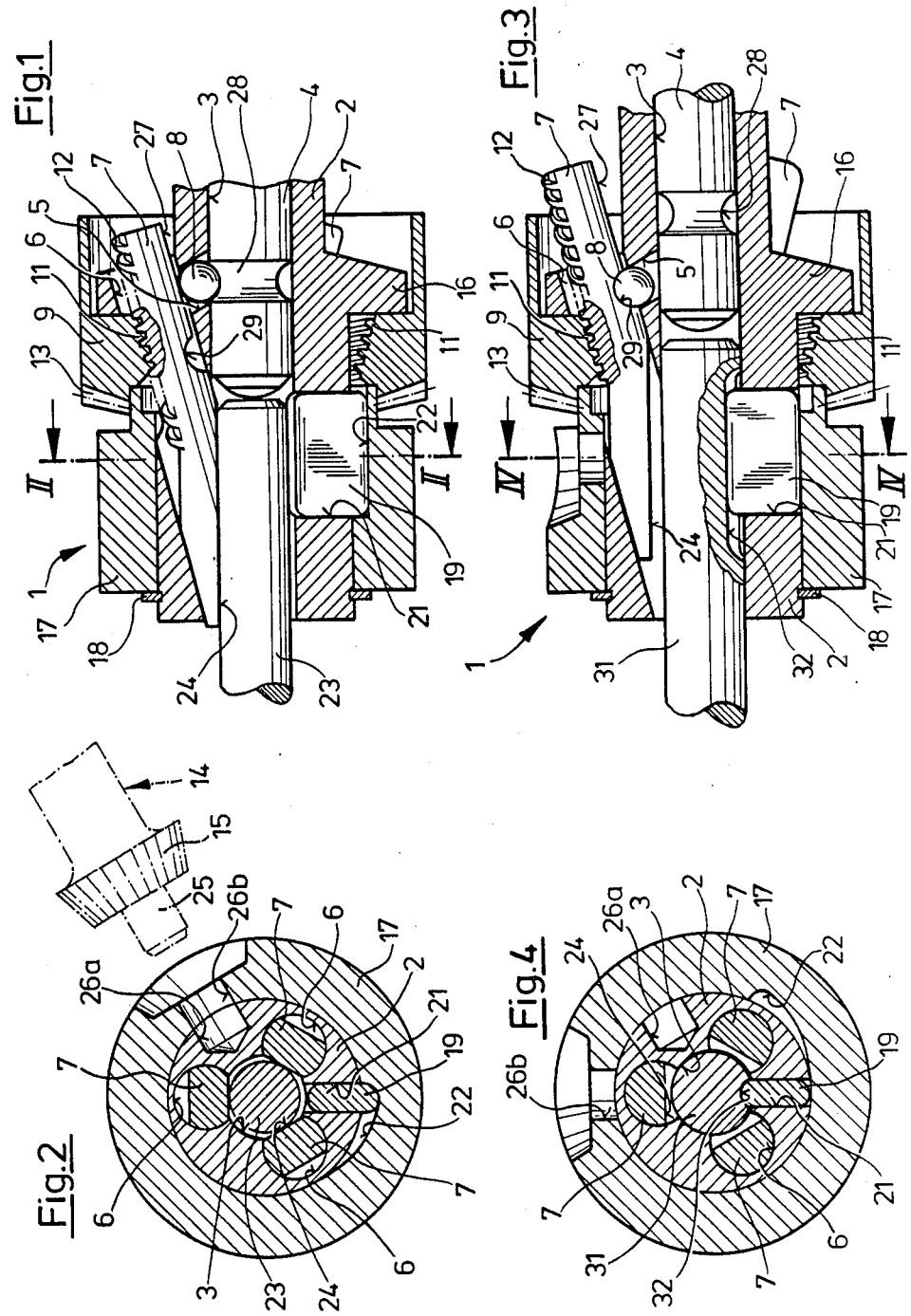

CHUCK FOR A DRILLING TOOL

BACKGROUND OF THE INVENTION

The present invention is directed to a chuck for a drilling tool such as a drill bit and includes a chuck member with a central bore into which an anvil extend for transmitting percussive force to the drilling tool shank. At least two clamping jaws are located in the chuck member and are adjustably displaceable in guide channels extending through the chuck member.

A chuck for a driving tool is disclosed in DE-OS No. 34 16 966 with a tool bit clamped in a chuck member so that selectively rotational motion or rotational motion and percussive force can be imparted to the tool bit. The tool bit extends in this known chuck into a central bore of an essentially sleeve-shaped chuck member with an essentially cylindrically shaped shank positioned in the central bore. Several clamping jaws are arranged equi-angularly around the shank and hold the shank in a frictional engagement for transmitting rotational movement to the tool bit. In addition, for imparting rotational movement, the chuck includes a locking member radially displaceable in the central bore for a positive locking action into axially extending entrainment grooves located in the shank. The entrainment grooves have a length in excess of the length of the locking member to assure axial mobility of the tool bit in the chuck during the transmittal of rotational motion. Such axial mobility affords the simultaneous transmission of percussive force by an anvil extending into the central bore so that the percussive force is transmitted through the tool bit to the material being worked. If the tool bit is held by the clamping jaws with only a frictional lock, such as is the case if the shank does not have entrainment grooves, then blows directed by the anvil against the shank can cause the frictional lock to loosen. In such an arrangement, it is not possible to impart rotational motion exclusively and reliably to the tool bit by a frictional locking action of the clamping jaws.

SUMMARY OF THE INVENTION

Therefore, it is the primary object of the present invention to assure the reliable transmission of rotational motion to a tool bit in a chuck of the above-described type by providing a frictional locking action by the clamping jaws.

In accordance with the present invention, a radially-displaceable retaining member is provided with a radial dimension so that it can extend radially outwardly or radially inwardly from a passageway located between the central bore and a guide channel for a clamping jaw. The clamping jaws and the anvil are provided with recesses for receiving the retaining members. Depending on the position of the clamping jaws within the chuck member, the retaining member projects either into the central bore in the chuck member or into the guide channel. If the clamping jaw corresponding to the retaining member is in a clamping position projecting into the central bore, the retaining member while it abuts the surface of the clamping jaw, extends into the central bore. In the radially inwardly projecting position, the retaining member extends into a recess in the end region of the anvil and holds the anvil so that it is unable to transmit persussive force to the shank in the chuck. Accordingly, if a drill bit is held by the clamping jaws in a frictionally locking manner, the bit cannot receive percussive force from the anvil and, as a result, receives only rotational motion.

On the other hand, if the clamping jaws are withdrawn from the central bore into a released position, then the retaining member projects radially outwardly into a recess in the jaw holding the jaw in the released position. Accordingly, with the retaining member no longer holding the anvil, it is possible for the anvil to transmit percussive force to the end of the shank of the bit.

Preferably, the retaining member has a spherical shape. A sphere is a machine element which can be fabricated economically and is distinguished by functional advantages, such as good mobility in the passageways through the chuck member.

The recess in the anvil is in the form of a annular constriction or recess. The annular recess has a concave bottom corresponding to the curvature of the sphere. With the retaining member seated in the recess, the recess forms a shoulder acting as a stop preventing the axial displacement of the anvil into a position where it can impart percussive force against the shank of the tool bit.

In a preferred embodiment, a recess is provided in the clamping jaw in a long side of the jaw extending along the guide channel with the recess having a flute-like form extending transversely of the long dimension of the guide channel. The clamping jaw has a clamping surface extending parallel with the axis of the central bore in the chuck member and extending forwardly from the long side of the jaw facing toward the tool bit. The clamping surface provides a frictionally locking engagement with the tool bit shank in the clamping position. The recess in the clamping jaw is arranged in the longitudinal side adjacent the transition to the clamping surface to afford the largest possible clamping travel of the jaws. The recess has a concave base corresponding to the curvature of the sphere-like retaining member. The depth of the recess corresponds to the radial dimension of the retaining member projecting into th guide channel.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawings:

FIG. 1 is an axially extending sectional view of a chuck frictionally locking a tool bit within a chuck member and with an anvil held in position preventing the transmission of percussive force;

FIG. 2 is a sectional view taken along the line II—II in FIG. 1, and illustrating in dot-dash lines a socket wrench for locking and releasing the clamping jaws;

FIG. 3 is a view similar to FIG. 1, however, with the clamping jaws shown in the released position and with the shank of a tool bit positively locked in position for receiving percussive force from the anvil; and FIG. 4 is cross-sectional view taken along the line IV—IV in FIG. 3.

DETAILED DESCRIPTION OF THE INVENTION

In the drawing, a chuck 1 includes an axially extending sleeve-shaped chuck member 2, connected in a manner not illustrated, to a driving implement, such as a hand drill, for imparting rotational motion. An axially extending central bore 3, extends through the chuck member 2, with the front end of the bore shown on the left-end of FIGS. 1 and 2. The driving tool includes an anvil 4, extending from a guidance duct into the central bore 3, so that it can be displaced in the axial direction of the bore.

A first passageway 5, extends radially through the chuck member 2 from the surface of the central bore 3 in the forward region of the anvil 4, shown in FIG. 1. The radially outer end of the first passageway 5 opens into a guide channel 6 for a clamping jaw 7. The guide channel 6 is elongated in the axial direction of the central bore 3 and is arranged at an acute angle relative to the axis of the central bore. Note that the guide channel intercepts the surface of the central bore forwardly of the anvil 4. A spherically shaped retaining member 8, is positioned within the first passageway 5, so that it can be displaced radially outwardly or inwardly.

As can be seen in FIG. 2, there are three equi-angularly spaced clamping jaws 7, extending through corresponding guide channels in the chuck member 2. A clamping ring 9, laterally encircles the chuck member 2. The clamping ring has an inner tapered thread 11, in engagement with corresponding threads 12 on the radially outer longitudinal side of the clamping jaws. 7. An annular bevel gear 13 is located on the front face of the clamping ring for locking or releasing the clamping jaws 7. A bevel gear rim 15 on the socket wrench 14 can engage the bevel gear 13 on the clamping ring 9.

At its rear end, the clamping ring 9, is supported by an annular flange 16 on the chuck member 2. Forwardly of the clamping ring, there is a locking sleeve 17 which prevents the displacement of the ring in the forward direction. A retaining ring 18, is fixed in the outer surface of the chuck member adjacent its front end and abuts the front end of the locking sleeve and fixes it in the axial direction. Locking sleeve 17 is supported on chuck member 2 so that it can rotate to a limited extent and provide radial displacement of a locking member 19 in a second passageway 21 in the chuck member 2. The second passageway 21 is located forwardly of the first passageway 5.

Clamping jaws 7 are used to clamp the cylindrical shank of tool bits without any grooves and possibly of different diameters. In FIGS. 1 and 2, a shank 23 is fixed in the central bore 3 by the frictional locking engagement of the clamping surfaces 24 of the clamping jaws 7 with the shank. Locking member 19, note FIG. 2, is in the radially outwardly displaced position due to its contact with the cam surface 22 in the radially inner surface of the locking sleeve 17. As a result, the locking member 19 does not extend into the central bore 3 and does not contact the surface of the shank 23. The socket wrench 14 has a support lug 25 which extends from one side of the gear rim 15 and fits into a two-part bore made up of a radially inner bore portion 26a in the chuck member 2, and a radially outer bore portion 26b, in the locking sleeve 17. In the inserted position, the socket wrench 14 can effect the displacement of the clamping jaws into and out of frictional locking engagement with the shank. It is only in the position of the locking sleeve shown in FIG. 2, with the locking member 19, displaced radially outwardly, that the bore portions 26a, 26b, are in register so that the socket wrench can be inserted for the displacement of the clamping jaws. When the socket wrench rotates the clamping ring 9, relative to the chuck member 2, the clamping jaws can be displaced in their longitudinal direction within the guide channels 6. When the clamping jaws are moved into clamping engagement, a longitudinally extending side 27 of the clamping jaw extends from the rear end of the clamping surface 24 and bears against the radially outer surface of the sphere 8, located within the first passageway 5. In this radially inner position, the retaining member or sphere 8, engages within an annular groove or recess 28, in the outer surface of the anvil 4 and holds the anvil in position so that it cannot transmit percussive force to the end of the tool bit shank as shown in FIG. 1. In this position, with the clamping jaws 7 gripping the shank, only rotational movement can be transmitted to the tool bit.

If a tool bit requiring rotational motion as well as percussive force is to be used, its rotational entrainment is effected via the locking member 19 while the clamping jaws 7 are displaced rearwardly so that their clamping surfaces 24 are held radially outwardly from the central bore 3, note FIG. 3. With the clamping jaws 7 in the rearward position, a rounded recess 29 is in register with the first passageway 5. The recess 29 is located in the longitudinal side 27 of the clamping jaw which extends rearwardly from the rear end of the clamping surface 24. With the recess 29 in register with the first passageway 5, the sphere 8 can move radially outwardly out of the central bore 3 into the recess 29. As a consequence, the anvil 4 can be displaced in the axial direction for transmitting percussive force from the driving tool to the shank 31. In FIG. 3, shank 31 of a tool bit can perform both rotational and percussive movement. The shank 31 has an axially extending entrainment groove 32 into which the locking member engages by the rotation of the locking sleeve 7 into the position shown in FIG. 4, where the cam surface 22 displaces the locking member radially inwardly into the groove 32. With the locking sleeve 17 rotated relative to the chuck member 2, the radially inner and radially outer portions 26a, 26b, are no longer in register, and it is not possible to use the socket wrench 14.

When the shank 31 is inserted into the central bore 3, and the anvil 4 is released by the retaining member 8, the shank can displace the anvil into position where it can transmit percussive force. Note the position of the end of the shank in FIG. 3, as compared to FIG. 1. As can be seen in FIG. 3, the surface on the end of the anvil 4, blocks the radially inner end of the passageway 5, whereby the sphere or retaining member 8 projecting into the recess 29, cannot move radially inwardly into the central bore 3. As a result, the clamping jaws 7 are held in the rearward position illustrated in FIG. 3, and a rotation of the clamping ring 9 relative to the chuck member 2, cannot be effected so that the clamping jaws 7 are held in the rearward position incapable of effecting a frictional lock with the shank 31. The groove 32 in the shank has a greater dimension in the axial direction of the central bore 3, than the blocking member 19, so that while the shank is locked, it can move in the axial direction for transmitting the percussive force.

While specific embodiments of the invention have been shown and described in detail to illustrate the application of the inventive principles, it will be understood that the invention may be embodied otherwise without departing from such principles.

I claim:

1. Chuck for receiving a shank of a drilling tool for selectively imparting rotational movement or the combination of rotational movement and axially directed percussive movement, comprising a chuck member having an axially extending central bore with an axially extending front end region and an axially extending rear end region, an axially extending anvil extending into the rear end region of said central bore and being axially displaceable between a first position, where it is incapable of transmitting percussive force and a second position where said anvil can transmit percussive force to the shank, axially extending guide channels located in said chuck member with the axis of said guide channels disposed at an acute angle to the axis of said central bore so that said guide channel intersect the central bore in the front end region with said guide channels flaring outwardly from said central bore in the direction toward the rear end region of said chuck member, at least two clamping jaws, each located in a different said guide channel, said clamping jaws being displaceable in the axial direction of said guide channels, wherein the improvement comprises a passageway located within the rear end region of said chuck member extending radially outwardly from the central bore in said chuck member to a radially outer surface of said chuck member, a retaining member located within said passageway and being axially displaceable therein between a radially inner position and a radially outer position, said retaining member having a dimension extending in the radial direction relative to said central bore greater than the dimension between said central bore and said radially outer surface of said chuck member, said anvil having an outer circumferential surface extending in the axial direction of said central bore with a first recess extending radially inwardly from said outer circumferential surface, said clamping jaws each having a second recess in an outside surface thereof facing toward said passageway so that said retaining member in the radially inner position fits into said first recess and in the radially outer position fits into said second recess.

2. Chuck, as set forth in claim 1, wherein said retaining member is in the form of a sphere.

3. Chuck, as set forth in claim 2, wherein said first recess is an annular recess in said anvil.

4. Chuck, as set forth in claim 3, wherein said clamping jaws have a longitudinal side directed inwardly toward said central bore and said longitudinal side has said second recess formed therein.

5. Chuck, as set forth in claim 4, wherein said second recess extends transversely of the longitudinal direction of said longitudinal side.

6. Chuck, as set forth in claim 5, wherein said first recess and said second recess each have a rounded bottom corresponding to the rounded surface of said sphere.

7. Chuck, as set forth in claim 6, wherein said clamping jaws each have a second longitudinal side opposite and radially outwardly from said longitudinal side containing said second recess, means mounted on said chuck member and engageable with the second longitudinal side of said clamping jaws for moving said clamping jaws in the axial direction of said guide channels.

8. Chuck, as set forth in claim 7, wherein said means comprises a clamping ring encircling said chuck member, threads formed on the second longitudinal side of said clamping jaws, said clamping ring having a thread thereon arranged to mesh with the threads on the second longitudinal side of said clamping jaws for displacing said clamping jaws in the axial direction of said guide channels, a bevel gear rim formed on said clamping ring, and means for engaging said bevel gear rim for rotating said clamping ring.

9. Chuck, as set forth in claim 8, wherein a locking sleeve is located on said chuck member encircling the front end region thereof and arranged to prevent axial movement of said clamping ring, a second passageway located in the front end region of said chuck member extending radially through said chuck member, a locking member located within said second passageway, said locking sleeve having a radially inner surface facing inwardly toward said central bore and a cam surface within said radially inner surface and engageable with said locking member, so that by limited rotation of said locking sleeve relative to said chuck member, said locking member can be displaced radially inwardly into said central bore.

* * * * *